Aug. 7, 1945.    J. BOLSEY    2,381,033
FILM MAGAZINE
Filed Dec. 7, 1943    2 Sheets-Sheet 1

INVENTOR:
Jacques Bolsey
BY Michael S. Striker
his agent

Aug. 7, 1945.   J. BOLSEY   2,381,033
FILM MAGAZINE
Filed Dec. 7, 1943   2 Sheets-Sheet 2
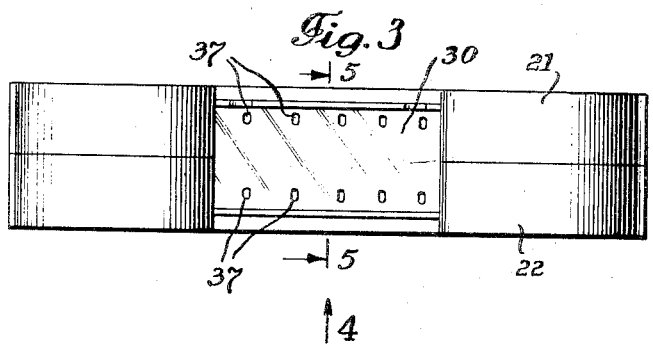
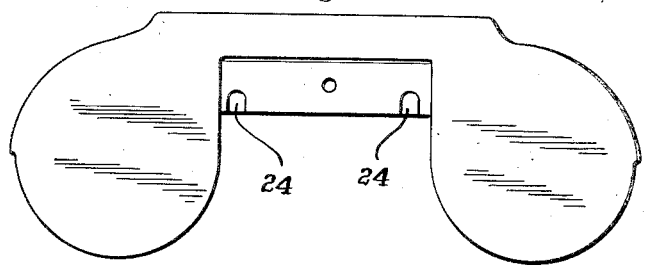
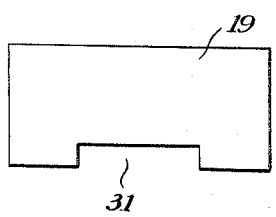
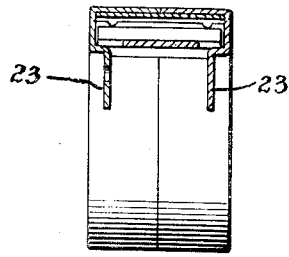
INVENTOR:
Jacques Bolsey
BY
Michael S Striker
his agent Patented Aug. 7, 1945

2,381,033

UNITED STATES PATENT OFFICE 2,381,033

FILM MAGAZINE

Jacques Bolsey, New York, N. Y.

Application December 7, 1943, Serial No. 513,256

10 Claims. (Cl. 95—31)

The present application is a continuation-in-part of my U. S. Patent No. 2,367,195, of January 16, 1945, for "Photographic cameras."

My present invention relates to photographic and cinematographic magazines for which strip film is used.

It is an object of my present invention to provide a film magazine of an entirely new design which is simple to produce and easy to handle.

It is a further object of my invention to provide a photographic magazine with a built-in pressure plate.

Another object of my present invention consists in a film magazine which can be combined with the camera body in such a manner as to use all available space within the camera body for useful purposes, thereby substantially reducing the camera size.

Still another object of my present invention consists of a film magazine housing the film in film containers which are entirely closed at the top and bottom and have only one narrow slit each for passage of the film, thereby preventing light from reaching the film coils within the containers when the magazine is removed from the camera.

With the above objects in view, my present invention mainly consists of a film magazine comprising two separate film compartments, a connecting supporting member secured to these compartments and holding the same spaced from each other and a resilient pressure member arranged between these film compartments resiliently attached to the connecting supporting member in such a manner as to be adapted to press the film to be exposed against the aperture surface of the camera body, thereby ensuring proper focusing during exposure.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 3 is a front view of the magazine shown in Fig. 1, seen in direction of arrow 3 in Fig. 1;

Figure 4 is a side view of the closed magazine, seen in the direction of arrow 4 in Fig. 3;

Figure 5 is a cross section through my new magazine along line 5—5 of Fig. 3;

Figure 6 is a top view of a pressure plate adapted to be used in combination with my new magazine, seen in direction of arrow 3 in Fig. 1.

Figure 1:
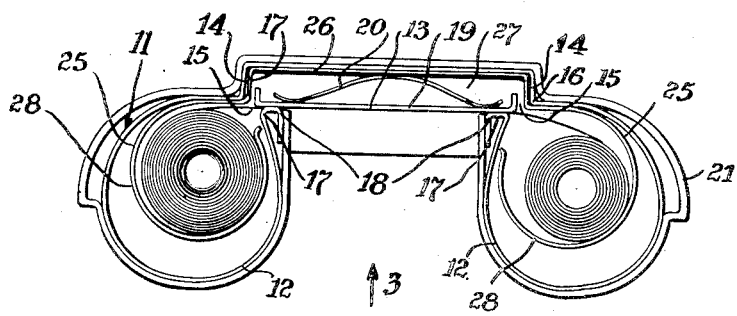
Figure 1 is a side view of the magazine with one of the magazine covers removed.

As shown in Figure 1, the main part of the magazine is the sheet metal strip 11; this metal strip 11 consists of two cylindrical strip portions 12 connected by the flat strip portion 13; this flat strip portion is at a slight distance from the cylindrical outer surface of the cylindrical strip portions 12 and connected with these strip portions by two short strip portions 14 which are substantially normal to the connecting strip portion 13; near the connecting strip portions 14 the two cylindrical strip portions 12 form, as shown in Fig. 1, two slits 15 limited by the edges 16 and 17 of the cylindrical strip portions 12. The end portions 18 of the cylindrical strip portions 12 are bent back in the same way shown in Fig. 1 to form abutments for the pressure plate 19 which is pressed against the strip portions 18 by a spring member 20.

Since the cylindrical spaces formed by the cylindrical strip portions 12 as well as the flat space formed by the pressure plate 19 and the connecting strip portion 13 are open on both sides, I provide two cover members 21 and 22 which serve mainly the purpose of covering the open sides of these spaces. I wish to stress that although in Fig. 3 these cover members 21, 22 are shown as entirely enclosing strip member 11, it is possible to space these two members 21, 22 from each other so that they actually cover only the open sides of strip member 11.

The shape of these cover members 21, 22 is clearly shown in the drawings, particularly in Figs. 3, 4, and 5. I wish only to mention that these cover members are provided with projecting wall portions 23 fitting into corresponding slits of the camera body, thereby preventing light from reaching the film during exposure. As shown in the drawings, these projecting wall portions are spaced from the edges of the cover members 21 and 22 and thus form a channel-shaped connecting member holding the film and preventing bulging of the same.

As shown in Figs. 4 and 5, one of these projections 23 might be provided with one or more cut-outs 24 cooperating with corresponding projections or pins of the camera body, thereby preventing incorrect insertion of the magazine into the camera.

Figure 2:
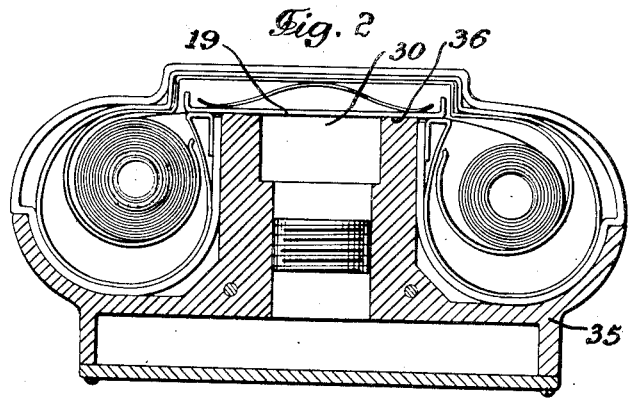
Figure 2 is a side view of the magazine shown in Fig. 1 in combination with a camera, the latter being shown in cross section.

As shown in Figs. 1 and 2, within the magazine formed by the strip member 11 I provide a spring member 25 consisting of a longitudinal flat spring portion 26 fitting into the channel-shaped connecting member 27 formed by the middle portions of the two cover members 21, 22 and of two helical spring portions 28 arranged in the cylindrical film coil containers formed by the cylindrical strip portions 12, so as to facilitate winding up of the film when the same is pushed into the containers.

I wish to stress that the magazine type shown in the drawings is used for photographic cameras in which the film strip 30 is transported by a film transporting member directly reaching into the perforations 37 of the film strip 30 and pulling or pushing this film strip from one film coil container into the other. In order to facilitate engagement of the film transporting member with the film strip 30 to be transported, I found it advantageous to provide a cut-out recess or deep groove in pressure plate 19 under at least one of the perforation recesses 37 of the film against which the pressure plate 19 is pressing. A cut-out 31 of this type in pressure plate 19 serving to facilitate engagement of the film transporting member with the film strip 30 is shown in Fig. 6. This cut-out has to be arranged in such a manner that it is under that portion of the film strip 30 which contains the perforations 37. Of course, I wish to stress that instead of a cut-out I might also provide an opening in the pressure plate 19 or otherwise provide for a free space under the perforations 37 to be engaged by the film transporting member.

Figure 7:
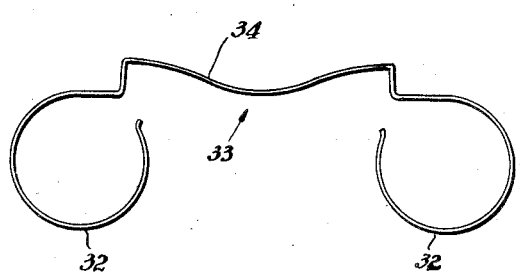
Figure 7 is a side view of a combined pressure member adapted to be used for my new magazine.

Furthermore, I wish to mention that the pressure spring 20 and the spring member 25 might also be combined as shown in Fig. 7. In this case, I use one combined spring member 33 instead of the two spring members 20 and 25; the two helical end portions 32 of this combined spring member 33 have exactly the same shape as the helical spring portions 28; however, the connecting spring portion 34 of the combined spring member 33 is curved, as shown in Fig. 7, so as to serve simultaneously as pressure spring holding the pressure plate 19 in operative position.

As shown in Fig. 2, my new magazine fits very well into corresponding compartments of the film camera 35. In operative position, the aperture face 36 of this camera presses against the film 30 which latter is under constant pressure of pressure plate 19. Thus, during exposure the film is always in contact with the aperture face 36, thereby ensuring proper focusing of the film during exposure. Since the camera itself is not claimed in the present application, it is not described in detail.

In order to hold the cover members 21 and 22 in proper position and to prevent that they become detached from the strip member 11, I might provide separate holding and locking means for these cover members. These holding and locking means might consist in studs arranged inside one of said cover members, preferably in the center of the cylindrical film coil containers formed by strip member 11 and the cover members 21 and 22. These studs cooperate with corresponding spring members arranged inside the other cover member and pressing against the two sides of the studs. These studs are provided with grooves arranged in such a manner that the springs engage these grooves when the cover members are closed. Additional grooves might be provided positioned in such a manner that when the springs engage these additional grooves the cover members are spaced at a certain distance from each other enabling introduction of cinematographic film between the projecting wall portions 23 of the cover members 21 and 22.

It will be understood that each of the elements described above, or two or more together, may also find a useful application in other types of film magazines differing from the types described above.

While I have illustrated and described the invention as embodied in film magazines without film transporting means I do not intend to be limited to the details shown, since various modifications and structural changes may be made without departing in any way from the spirit of my invention.

Without further analysis, the foregoing will so fully reveal the the gist of my invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What I claim as new and desire to secure by Letters Patent is:

1. A film magazine comprising two closed film compartments, one for the unexposed and the other for the exposed film coil, a channel-shaped open connecting member having a U-shaped cross section and secured to both film compartments holding them spaced from each other so as to form between said film compartments a space into which fits a camera body, and a spring operated pressure plate arranged within said open channel-shaped connecting member at the bottom of the same with its operative pressing surface facing said space between said film compartments and pressing against said camera body when said film magazine is in operative position with said camera body inserted in said space between said film compartments and projecting into said channel-shaped open connecting member, said resilient pressure plate being arranged in said channel-shaped connecting member substantially in a plane tangential to the outermost windings of the film coils in said film compartments, and means holding said resilient pressure member within said channel shaped connecting member.

2. A film magazine comprising two separate light tight film coil containers, a channel-shaped open connecting member having a U-shaped cross section and secured to both film coil containers and holding them spaced from each other so as to form between said film containers a space into which fits a camera body, a spring operated pressure plate arranged within said open channel-shaped connecting member at the bottom of the same between said film coil containers with its operative pressing surface facing said space between the same and pressing against the rear face of said camera body when said film magazine is in operative position with said camera body inserted in said space between said film containers and projecting into said channel-shaped open connecting member, said spring operated resilient pressure plate being arranged in said channel-shaped connecting member substantially in a plane tangential to the outer windings of the film coils in said film containers, means holding said resilient pressure plate within said channel shaped connecting member and one slit-shaped opening in each of said film coil containers arranged substantially adjacent to said resilient pressure plate.

3. A film magazine comprising two separate light tight substantially cylindrical film coil containers, a channel-shaped open connecting member having a U-shaped cross section and secured to both of said film coil containers substantially in a plane tangential to the cylindrical surface of said containers and holding the same spaced from each other so as to form between said film containers a space into which fits a camera body, a spring operated pressure plate arranged within and parallel to said open channel-shaped connecting member at the bottom of the same between said cylindrical film coil containers with its operative pressing surface facing said space between the same and pressing against the rear face of said camera body when said film magazine is in operative position with said camera body inserted in said space between said film containers and projecting into said channel-shaped open connecting member, said spring operated pressure plate being arranged in said open channel-shaped connecting member in such a manner as to lie substantially in a plane tangential to the outer film windings of the film coils in said film coil containers, means holding said pressure plate within said channel shaped connecting member, and a slit shaped opening in the wall of each of said film coil containers arranged substantially adjacent to that edge of said pressure plate which is nearest to the respective container.

4. A film magazine comprising two separate light tight substantially cylindrical film coil containers, a channel-shaped open connecting member having a U-shaped cross section and secured to both of said film coil containers substantially in a plane tangential to the cylindrical surface of said containers and holding the same spaced from each other so as to form between said film containers a space into which fits a camera body, a spring operated pressure plate arranged within and parallel to said open channel-shaped connecting member at the bottom of the same between said cylindrical film coil containers with its operative pressing surface facing said space between said film containers and pressing against the rear end of said camera body when said film magazine is in operative position with said camera body inserted in said space between said film containers and projecting into said channel-shaped open connecting member, a slit shaped opening in the wall of each of said film coil containers arranged substantially adjacent to that edge of said pressure plate which is nearest to the respective container, a spring member arranged within said channel shaped connecting member and reaching through said slit shaped openings into said film coil containers, said spring member consisting of a connecting spring portion fitting into and arranged within said channel-shaped connecting member and two helical spring portions at the ends of said connecting spring portion fitting into said film coil containers and arranged within the same so as to facilitate coiling up of the film coil in the respective film container when the film is inserted through said slit shaped opening into said container and pushed against the inner surface of said helical spring portion, and means holding said spring member in said channel shaped connecting member and said film coil containers.

5. A film magazine of the character described comprising two separate light tight substantially cylindrical film coil containers spaced apart from each other and forming those two opposite sides of the exposure aperture of said magazine which are normal to the direction of the path of the film during exposure, a channel-shaped connecting member consisting of a channel bottom and two parallel longitudinal channel walls, said parallel longitudinal channel walls forming those two opposite sides of said exposure opening which are parallel to the direction of the path of the film during exposure said channel-shaped connecting member being secured at its end to said film coil containers and holding them spaced from each other so as to form between said film containers a space into which fits a camera body, a resilient pressure plate secured to said open channel-shaped connecting member at the bottom of the same between said film coil container with its operative pressing surface facing the space between the same, extending substantially over the entire surface of said exposure aperture of said film magazine and pressing against said camera body when said film magazine is in operative position with said camera body inserted in said space between said film containers and projecting into said channel-shaped open connecting member, and means holding said resilient pressure plate within said channel shaped connecting member at the bottom of the same.

6. A film magazine of the character described comprising two separate light tight substantially cylindrical film coil containers spaced apart from each other and forming those two opposite sides of the exposure aperture of said magazine which are normal to the direction of the path of the film during exposure, a channel-shaped connecting member consisting of a channel bottom and two parallel longitudinal channel walls, said parallel longitudinal channel walls forming those two opposite sides of said exposure opening which are parallel to the direction of the path of the film during exposure, the ends of said channel bottom and channel walls being secured to said film coil containers holding the same spaced from each other so as to form between said film containers a space into which fits a camera body, a resilient pressure plate secured to said open channel-shaped connecting member within and at the bottom of the same between said film coil container with its operative pressing surface facing the space between the same extending substantially over the entire surface of said exposure aperture of said film magazine and pressing against said camera body when said film magazine is in operative position with said camera body inserted in said space between said film containers and projecting into said channel-shaped open connecting member, a pressure spring member consisting of a curved connecting spring portion arranged within said channel-shaped connecting member and pressing against said pressure plate holding thereby the same in operative position and two helical spring portions at the ends of said curved connecting spring portion reaching into said film coil containers and arranged within the same in such a manner as to facilitate coiling up of a film coil in each of said containers, and means holding said pressure spring member within said channel shaped connecting member and said film coil containers.

7. A film magazine comprising two separate light tight film coil containers, a channel-shaped connecting member secured to both film coil containers and holding them spaced from each other so as to form between said film containers a space into which fits a camera body, a slit shaped opening in each of said film coil containers arranged near said channel-shaped connecting member and extending normal thereto, a pressure spring member consisting of a curved connecting spring portion serving as pressure spring and arranged within said channel-shaped connecting member at the bottom of the same and reaching through said slit shaped openings into said film coil containers and forming within the same two helical spring portions arranged within said film coil containers in such a manner as to facilitate coiling up of the film coil in the respective film container when the film is inserted through said slit shaped opening into said container and pushed against the inner surface of said helical spring portion and a pressure plate arranged within said channel-shaped connecting member near the bottom of the same with its operative pressing surface facing said space between said film compartments and pressed by said curved connecting spring portion of said pressure spring member against the rear face of said camera body when said film magazine is in operative position with said camera body inserted in said space between said film containers and projecting into said channel-shaped open connecting member.

8. A film magazine consisting of a sheet metal strip having the shape of two cylindrical strip portions connected by a flat connecting strip portion being at a slight distance from the cylindrical outer surface of said cylindrical strip portions and connected with the same by two short strip portions extending substantially normal to said connecting strip portion and forming near said connecting strip portion two slits in said cylindrical strip portions extending normal to the longitudinal direction of said connecting strip portion, a pressure plate arranged between said cylindrical strip portions parallel to said connecting strip portion spaced from the same with its pressing surface facing the space between said cylindrical strip portions, a pressure spring arranged in the space between said pressure plate and said connecting strip portion, and two cover members arranged parallel to each other and closing the open sides of said cylindrical strip portions and both sides of the space formed between said connecting strip portion and said pressure plate and shaped in such a manner as to hold said pressure plate within the space formed by said connecting strip portion and said cover members, said cover members thus forming together with said cylindrical strip portions two film compartments, one for an unexposed and the other for an exposed film coil and also forming together with said flat connecting strip portion a channel-shaped open connecting member having a U-shaped cross section holding said two film compartments formed by said cylindrical strip portions and said cover members spaced from each other so as to form between them a space into which fits a camera body against the rear face of which said pressure plate is pressed by said pressure spring when said film magazine is in operative position.

9. A film magazine composed of a sheet metal strip member consisting of two cylindrical strip portions connected by a curved connecting spring portion being at its ends at a slight distance from the cylindrical outer surfaces of said cylindrical strip portions and connected with the same by two short strip portions extending substantially normal to said curved connecting spring portion, one slit in each of said cylindrical strip portions extending normal to the longitudinal direction of said connecting strip portion adjacent to the corresponding short strip portion, a pressure plate arranged between said cylindrical strip portions parallel to said connecting strip portion in contact with the same and pressed by it toward the space between said cylindrical strip portions, and two cover members arranged parallel to each other closing the open sides of said cylindrical strip portions and both sides of the space formed between said connecting strip portion and said pressure plate and means holding said pressure plate in the space formed by said connecting strip portion, said two short strip portions and said two cover members; said cover members together with said two cylindrical strip portions forming two film compartments, one for an unexposed and the other for an exposed film coil and also forming together with said curved connecting spring portion and said short strip portions a substantially open channel-shaped connecting member having a U-shaped cross section holding the said two film compartments formed by said cylindrical strip portions and said cover members spaced from each other so as to form between them a space into which fits a camera body against the rear face of which said pressure plate is pressed by said curved connecting spring portion when said film magazine is in operative position.

10. A film magazine composed of a sheet metal strip member consisting of two cylindrical strip portions connected by a curved connecting spring portion being at its ends at a slight distance from the cylindrical outer surfaces of said cylindrical strip portions and connected with the same by two short strip portions extending substantially normal to said curved connecting spring portion, one slit in each of said cylindrical strip portions extending normal to the longitudinal direction of said connecting strip portion adjacent to the corresponding short strip portion, a pressure plate arranged between said cylindrical strip portions extending with its ends into said slits in said cylindrical strip portions, said pressure plate being in contact with said curved connecting strip portion and being pressed by the same against said cylindrical strip portions, thus closing the slits within the same, and two cover memebrs arranged parallel to each other closing the open sides of said cylindrical strip portions and both sides of the space formed between said connecting strip portion and said pressure plate, said cover members thus forming together with said cylindrical strip portions two film compartments, having each a slit through which the film is moving from one of said compartments into the other while being pressed by said pressure plate, said cover members forming also together with said curved connecting spring portion a channel-shaped open connecting member having a U-shaped cross section holding said two film compartments formed by said cylindrical strip portions and said cover members spaced from each other so as to form between them a space into which fits a camera body against the rear face of which said pressure plate is pressed by said pressure spring when said film magazine is in operative position.

JACQUES BOLSEY.